United States Patent
Pop

(10) Patent No.: US 10,897,124 B2
(45) Date of Patent: Jan. 19, 2021

(54) HIGH VOLTAGE SITE ALARM SIGNALING SYSTEM AND METHOD FOR ELECTRICAL CABINETRY

(71) Applicant: ADVANCETREX SENSOR TECHNOLOGIES CORP., Walnut, CA (US)

(72) Inventor: Florin Pop, Morton Grove, IL (US)

(73) Assignee: ADVANCETREX SENSOR TECHNOLOGIES CORP., Walnut, CA (US)

( * ) Notice: Subject to any disclaimer, the term of this patent is extended or adjusted under 35 U.S.C. 154(b) by 0 days.

(21) Appl. No.: 16/255,687

(22) Filed: Jan. 23, 2019

(65) Prior Publication Data

US 2019/0229504 A1 Jul. 25, 2019

Related U.S. Application Data

(60) Provisional application No. 62/621,939, filed on Jan. 25, 2018.

(51) Int. Cl.
*H02B 1/30* (2006.01)
*H02B 1/32* (2006.01)
(Continued)

(52) U.S. Cl.
CPC ........... *H02B 1/306* (2013.01); *G08B 1/08* (2013.01); *G08B 3/1008* (2013.01); *G08B 5/36* (2013.01);
(Continued)

(58) Field of Classification Search
CPC . H02B 1/306; H02B 1/32; H02B 1/38; H02B 3/00; H02B 13/025; G08B 1/08; G08B 3/1008; G08B 5/36; G08B 21/02
See application file for complete search history.

(56) References Cited

U.S. PATENT DOCUMENTS 10,037,673 B1 * 7/2018 Gray .................. G08B 21/22
2010/0246648 A1 * 9/2010 Rocamora ............ H04B 3/56
375/222

(Continued)

OTHER PUBLICATIONS

"LM3406 1.5-A, Constant Current, Buck Regulator for Driving High Power LEDs," Texas Instruments, 1-38 (2008).

*Primary Examiner* — Brian A Zimmerman
*Assistant Examiner* — Kevin Lau
(74) *Attorney, Agent, or Firm* — HoustonHogle LLP

(57) ABSTRACT

A safety system for high-voltage electrical cabinetry presents alarm indications representing alarm conditions of the electrical switchgear cabinet system at every electrical switchgear cabinet during maintenance. The system includes encoder and decoder devices connected to existing switchgear cabinet lighting infrastructure. The encoder devices receive alarm signals from a control system of the electrical switchgear cabinet system and send encoded alarm signals to the decoder devices by modulating power relayed from the encoder devices to the decoder devices and possibly to lamps. The decoder devices decode the encoded alarm signals and present the alarm indications audibly and/or visually using light and sound indicators. A technician performing maintenance can evaluate instantly the importance of the alarm based on the alarm indications and act accordingly.

26 Claims, 11 Drawing Sheets

(51) Int. Cl.
  *H02B 1/38*   (2006.01)
  *G08B 21/02*  (2006.01)
  *G08B 3/10*   (2006.01)
  *G08B 5/36*   (2006.01)
  *G08B 1/08*   (2006.01)
  *H02B 13/025* (2006.01)
  *H02B 3/00*   (2006.01)

(52) U.S. Cl.
  CPC ............... *G08B 21/02* (2013.01); *H02B 1/32* (2013.01); *H02B 1/38* (2013.01); *H02B 3/00* (2013.01); *H02B 13/025* (2013.01)

(56) References Cited

U.S. PATENT DOCUMENTS

| | | | |
|---|---|---|---|
| 2012/0286674 A1* | 11/2012 | Takanashi | H05B 33/0869 |
| | | | 315/158 |
| 2016/0086474 A1* | 3/2016 | Zhang | G08B 21/18 |
| | | | 340/635 |
| 2019/0172189 A1 | 6/2019 | Pop | |
| 2019/0281680 A1* | 9/2019 | Thorne | H05B 33/0857 |

\* cited by examiner

HIGH VOLTAGE SITE ALARM SIGNALING SYSTEM AND METHOD FOR ELECTRICAL CABINETRY

RELATED APPLICATIONS

This application claims the benefit under 35 USC 119(e) of U.S. Provisional Application No. 62/621,939, filed on Jan. 25, 2018, which is incorporated herein by reference in its entirety.

BACKGROUND OF THE INVENTION

High-voltage electrical switchgear is used to control, protect, and isolate electrical equipment providing power to premises such as office buildings, hospitals, warehouses, data centers, factories, retail establishments, shopping malls, schools, multi-unit dwellings, government buildings, and embassies, to name a few examples. Typically, in an enclosed building, the high-voltage switchgear is contained in one or more cabinets located in a secure electrical room. Depending on the voltage levels involved, the switchgear may be located in an electrical substation or in an outdoor staging area. The high-voltage switchgear includes programmable logic controllers (PLC) configured to control one or more cabinets, and each cabinet may include high-voltage, high-current power conducting elements such as circuit breakers, fuses, switches, lightning arrestors and other components used to energize and de-energize the switchgear to allow work to be performed and clear faults downstream.

Switchgear can be dangerous, and accidents can, and do occur. This is especially true, for example, when the high-voltage equipment is re-energized. During re-energization of the equipment, if an abnormal condition develops, which may be caused by poor design, a stray object or tool being dropped inside the cabinet, by faulty wiring, or by a ground-fault, a large electrical arc or an explosion may be produced. Such an electrical arc can be lethal many feet away, and depending on the power levels involved, could be potentially lethal to anyone within the entire electrical room. A large electrical arc may be produced even at lower voltages, such as 480 volts.

At the same time, traditionally, lighting in high voltage rooms was often poor and typically uncontrolled. Such room lighting was not sufficient for the technician to comfortably see inside the cabinet once the cabinet door is opened during the time that a technician may be performing repairs or maintenance. Recently, smart lighting systems have been proposed. One such system is described in U.S. patent application Ser. No. 15/833,087, filed on Dec. 6, 2017, entitled, "Sensing and Alert System for Electrical Switchgear," which discloses a sensing and alert system with time of flight (ToF) sensors and lighting modules installed inside each switchgear cabinet. As one of the safety features provided by the sensing and alert system, the lighting module illuminates an inside portion of the cabinet in response to the ToF sensor detecting that the cabinet door was opened.

SUMMARY OF THE INVENTION

During maintenance on an electrical switchgear system, it is important that technicians performing the maintenance work are aware of any critical alarms which might appear during maintenance. If an alarm is related to critical backup power for cabinet lighting or other critical system, for example, the alarm needs to be communicated to the technician right away. In some cases, the critical alarms might even be caused by the work being performed by the technician.

Currently, systems provide such alarm indication at the main control cabinet. Light and sound indicators in some cases are located in the control cabinet, providing visual and audio indication of the critical alarms. However, technicians are often performing work at a distance from the control cabinet, and ambient noise can make hearing audio indications difficult. As a result, alarms can remain unnoticed.

Thus, a need exists for remote signaling equipment installed in every electrical switchgear cabinet. However, one major problem for developing solutions that apply to existing electrical switchgear installations is the fact that these industrial cabinets are subject to standards specified by safety organizations such as Underwriters Laboratories (UL) in order to be UL listed, resulting in a requirement that any mechanical or electrical added equipment, including alarm indication equipment might void the UL compliant status of the cabinets. Because of the stringent UL specifications, it is difficult to retrofit safety features into existing electrical cabinets. For example, such UL specifications do not permit drilling into the cabinet for any reason to attach components.

According to the present invention, a safety system for high-voltage electrical cabinetry is proposed in which alarm indications are presented, possibly, at every electrical switchgear cabinet during maintenance. The system can use the existing switchgear cabinet infrastructure, particularly an automatic lighting infrastructure in conjunction with encoder and decoder devices, the latter of which might even "clamp on" to the existing lamps as retrofit solutions. Different types of alarm are encoded and presented audibly or visually using, for example, blinking light-emitting diode (LED) or audible beeping patterns. A technician performing maintenance can evaluate instantly the importance of the alarm and act accordingly without delay.

In a specific example, on the central control cabinet, an encoder device modulates the 24 Volt (V) DC used to power the cabinet lamps. Decoder devices are then placed interposed between the power circuit and the lamps. The decoder devices might be clamped onto the existing cabinet lamp or incorporated as additional circuitry integrated inside the lamps. One way to minimize complexity and for retrofit solutions is to use very low frequency pulse position encoding, with pulses implemented as shorts spans (e.g. microseconds (μs)) of 0 V across the power circuit. The duty cycle will be 99.99% or higher to avoid energy transfer loss from a power supply to the lamps. The pulse-position timing pattern encodes the alarm type that is supposed to be transmitted to lamp.

Different decoder devices in different locations might be configured to decode only a subset of possible alarm type encodings or to present alarm indications for only a subset of decoded alarm signals. For example, for a set of six possible alarm types that can be encoded by the encoder device, the decoder devices installed in one area might be configured to decode and present only three of the types, while the decoder devices installed elsewhere in different areas might be configured to decode and present only the other three types.

In general, according to one aspect, the invention features an alarm signaling system for electrical switchgear cabinets, which are illuminated by lamps, the lamps being powered by a power supply via a power circuit. The system includes an encoder device and decoder devices. The encoder device relays power from the power supply to the power circuit and generates encoded alarm signals on the power circuit. The decoder devices decode the encoded alarm signals and, based on the decoded alarm signals, present alarm indications via indicators of the decoder devices to persons.

In embodiments, the encoder device might comprise an encoding module for generating pulse sequences representing alarm conditions and a signal driver for sending the encoded alarm signals to the power circuit by modulating the relayed power based on the pulse sequences. The signal driver would modulate the relayed power with a duty cycle greater than 99.99%.

The decoder devices might be interposed between the power circuit and the lamps, relaying power from the power circuit to the lamps. In this case, filter mechanisms would filter the encoded alarm signals from the power consumed by the decoder devices and from the power relayed by the decoder devices to the lamps.

On the other hand, the decoder devices might connect to the power circuit in parallel with the lamps, with both the decoder devices and the lamps receiving the power relayed by the encoder devices, including the alarm signals, directly via the power circuit.

The encoder device might comprise one or more input ports. Through these input ports, the encoder device would receive alarm signals from an external control system. In this case, the encoder device would generate the encoded alarm signals based on the alarm signals received via the input ports.

Different encoded alarm signals might represent different alarm conditions for the electrical switchgear cabinets, including a loss of power, a switch to a backup generator and/or an overload condition. The indicators could then present the alarm conditions via LEDs and/or annunciators by emitting light and/or sound with different properties based on the different alarm conditions represented by the encoded alarm signals. These different properties might include modulated light intensity, changing colors and/or intermittent buzzing sounds.

In general, according to another aspect, the invention features a method for signaling alarms for electrical switchgear cabinets, which are illuminated by lamps, the lamps being powered by a power supply via a power circuit. Encoder devices relay power from the power supply to the power circuit and generate encoded alarm signals on the power circuit. Decoder devices then decode the encoded alarm signals and present alarm indications to persons based on the decoded alarm signals.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
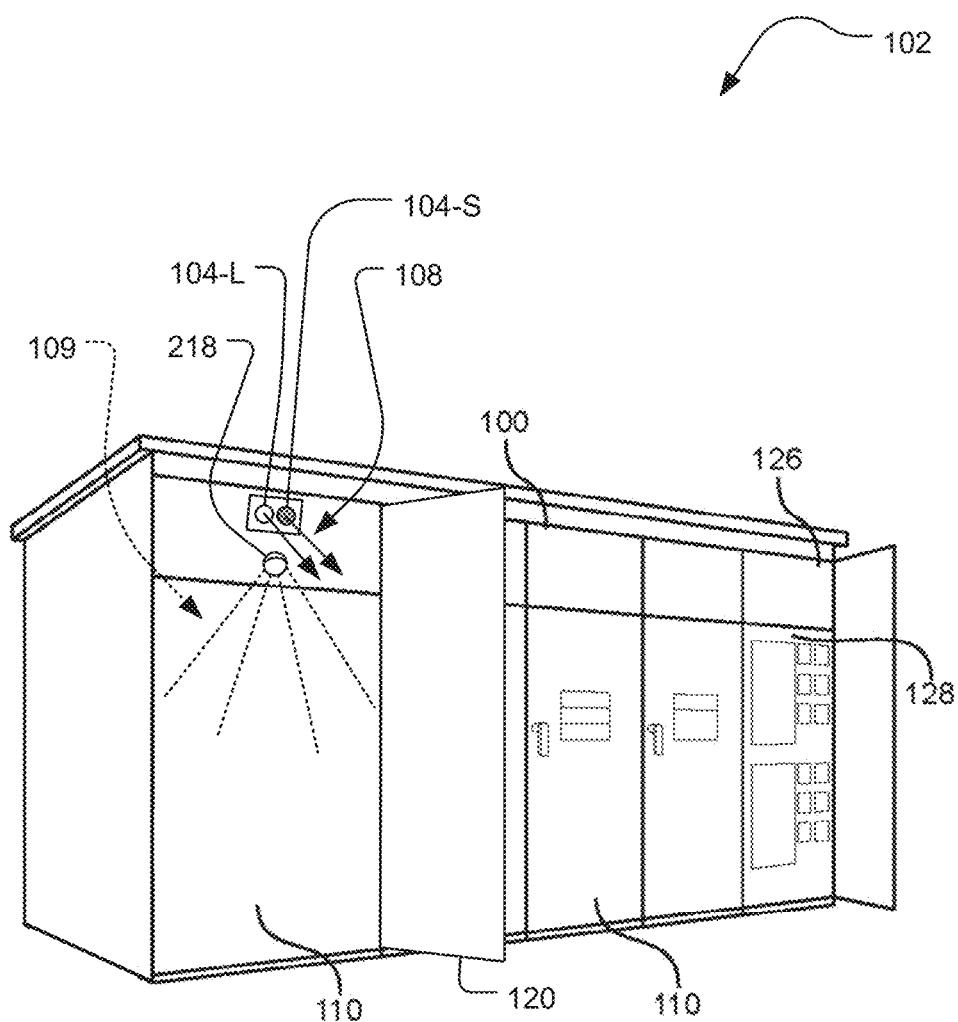
FIG. 1 is a perspective drawing of an alarm signaling system for an electrical switchgear cabinet system according to one embodiment of the present invention.

FIG. 1 is a perspective drawing of an alarm signaling system 102 for an electrical switchgear cabinet system 100 according to one embodiment of the present invention.

The electrical switchgear cabinet system 100 includes one or more high-voltage switchgear cabinets 110, each having one or more high-voltage power conducting elements (e.g. circuit breakers, fuses, switches, lightning arrestors) disposed internal to the cabinet 110 and protected by a lockable door 120. Typically these high-voltage circuit breakers switch circuits operating above 1000 Volts (V) for alternating current, and at least 1500 V for direct current. However, the term "high-voltage" for the purposes of the presently disclosed system can be understood to include any voltage high enough to inflict harm on living organisms, typically including 600 V or greater.

A control cabinet 126 houses a control system 128, which may be a central programmable logic controller (PLC). The control system 128 may control one or many switchgear cabinets 110. For purposes of clarity only four switchgear cabinets 110 are shown, but any suitable number of switchgear cabinets may be included in the electrical switchgear system 100 depending upon the size of the installation and the particular application.

Additionally, in the preferred embodiment, the electrical switchgear cabinet system 100 is assumed to have an automatic lighting system installed. The lighting system includes a dedicated lighting power circuit providing power to lamps 218, each of which provides cabinet illumination 109 for a different electrical switchgear cabinet 110 by illuminating the inside of the cabinet, for example, when the door 120 for that electrical switchgear cabinet 110 is opened and turning off when the door 120 is closed. The automatic lighting system might detect the opening of the door 120 to the electrical switchgear cabinet 110 in a number of ways. In one example, a time of flight (ToF) sensor inside each cabinet 110 detects when the cabinet door 120 is open. Other examples include mechanical switches that are opened or closed when the cabinet doors are opened.

In general, the alarm signaling system 102 receives alarm signals (e.g. from the control system 128) and, based on the alarm signals, presents alarm indications 108 to persons such as technicians performing maintenance on the electrical switchgear cabinets 110 via one or more indicators 104 of the alarm signaling system 102. The indicators 104 include light indicators 104-L, which present the status information by emitting light via colored light-emitting diodes (LEDs), and sound indicators 104-S, which present the status information by emitting sounds via annunciators and/or speakers. In the preferred embodiment, each electrical switchgear cabinet 110 includes one or more indicators 104.

For example, in the illustration, the leftmost electrical switchgear cabinet 110 has its door 120 open, revealing the lamp 218 providing the cabinet illumination 109 and the alarm indicators 104, including a light indicator 104-L and a sound indicator 104-S, providing the alarm indications 108. Although their interior portions are not visible in the illustrated example, each of the electrical switchgear cabinets 110 would similarly include its own lamp 218 and indicators 104 according to the preferred embodiment of the invention.

The alarm indications 108 pertain to alarm conditions of the electrical switchgear system 100 and might include light or sound emitted by the indicators 104. The emitted light and sound might even have different properties, such as modulated light intensity, changing colors, blinking lights, and/or intermittent buzzing sounds, based on different alarm conditions being communicated via the alarm indications 108.

The alarm conditions generally include conditions of the electrical switchgear cabinet system 100 which need to be communicated to technicians actively performing; maintenance work on the electrical switchgear cabinet system 100. The alarm conditions might pose a hazard to the technician, or the alarm conditions could have been caused by the work being performed by the technician. Different types of alarm conditions include a loss of power, a switch to a backup generator and/or an overload condition, to list a few examples.

Figure 2A:
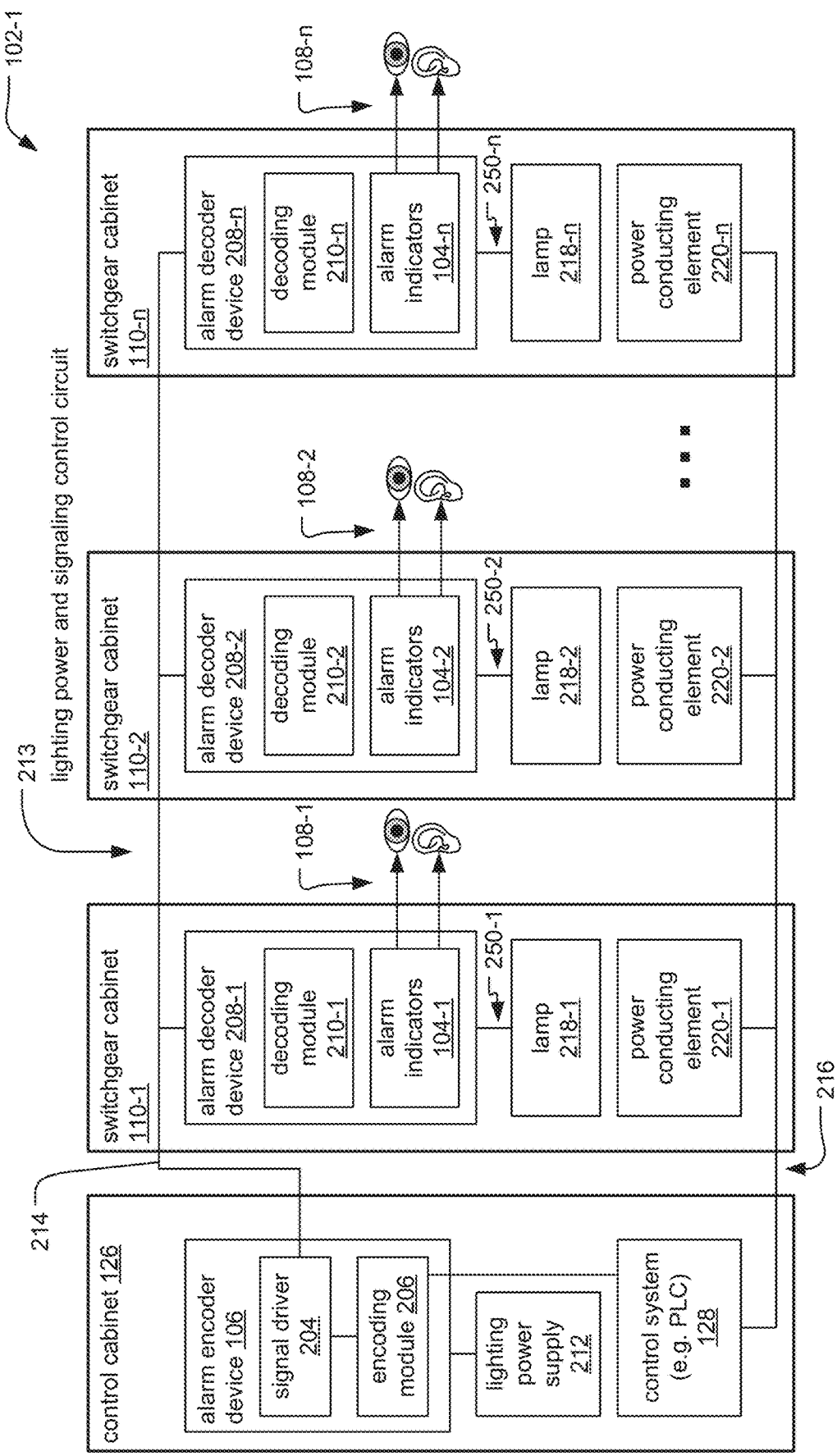
FIG. 2A is a block diagram of the alarm signaling system according to an embodiment in which decoder devices of the alarm signaling system are interposed between a lighting power circuit and lamps illuminating cabinets of the electrical switchgear cabinet system.

FIG. 2A is a block diagram of the alarm signaling system 102-1 according to one embodiment of the invention.

In the illustrated example, the alarm signaling system 102-1 is shown along with the electrical switchgear system 100 for which the alarm signaling system 102-1 presents the alarm indications and the lighting system providing the cabinet illumination 109 of the electrical switchgear cabinets 110.

As previously described with respect to FIG. 1, the control cabinet 126 houses the control system 128, which controls power conducting elements 220 (e.g. circuit breakers, fuses, switches, lightning arrestors) of the electrical switchgear cabinets 110 via a switchgear control/power circuit 216. The control cabinet 126 may further house various transformers that provide low voltages, e.g., 24 V DC, which is the preferred voltage level for the control system 128 and associated control signals. The 24 V DC signal may be provided by the control cabinet 126 to each high-voltage switchgear cabinet 110 in a daisy-chain manner from cabinet to cabinet using standard wiring. Use of 24 V DC control signaling is preferable because 24 V is sufficiently low so as not to present a shock hazard if inadvertently touched by a human, yet sufficiently high so as to be resistant to electrical noise and other induced or stray radiation. A battery backup system (not shown) may also provide the 24 V DC power to the components.

In parallel, a lighting power supply 212 provides power to a series of lamps 218 associated with each of the electrical switchgear cabinets 110 via a lighting power circuit 213. The lighting power circuit 213 includes one or more conductors 214 (e.g. wires) for conducting electrical current to the lamps 218. As previously described, the lamps 218 might be configured to turn on when the doors 120 to the electrical switchgear cabinets 110 in which the lamps 218 are installed are opened. In the illustrated example, the lighting power supply 212 is shown inside the control cabinet 126 and could even receive power from the control cabinet 126 (for example, from one of the previously mentioned transformers providing 24 V DC). However, in embodiments, the lighting power supply 212 might be outside the control cabinet 126.

In general, the alarm signaling system 102 includes an encoder device 106 and a series of decoder devices 208. The encoder device 106 is interposed between the lighting power supply 212 and the lighting power circuit 213, receives power from the lighting power supply 212, relays the power from the lighting power supply 212 to the lighting power circuit 213, and generates encoded alarm signals on the lighting power circuit 213. The decoder devices 208, which are connected to the lighting power circuit 213, decode the encoded alarm signals and present the alarm indications 108 via the indicators 104 to the technicians based on the decoded alarm signals.

More specifically, the encoder device 106 includes a signal driver 204 and an encoding module 206.

The encoding module 206 receives input (e.g. alarm signals representing different alarm conditions) from the control system 128. Based on the alarm signals, the encoding module generates pulse sequences representing the alarm conditions and signals the pulse sequences to the signal driver 204.

The signal driver 204 modulates the power relayed to the lighting power circuit 213 based on the pulse sequences. In the preferred embodiment, the signal driver 204 is configured to modulate the relayed power with a duty cycle greater than 90% and preferably greater than 99% and can be as large as 99.99%.

Each electrical switchgear cabinet 110 includes one of the decoder devices 208 along with the lamp 218 and the power conducting element 220.

The decoder device 208 includes a decoding module 210 and the alarm indicators 104.

The decoding module 210 decodes the encoded alarm signal from the lighting power circuit 213 and drives the indicators 104 to present the alarm indications 108 based on the decoded alarm signal. The decoding module 210 might be configured to recognize particular pulse sequences and present the alarm indications 108 based on the recognized pulse sequences, for example, by driving the indicators 104 to emit the light and/or sound with different properties based on which pulse sequence was recognized by the decoding module 210. In one example, decoding modules 210 for different decoder devices 208 in different locations with respect to each other might be configured to decode and/or present only a subset of possible encoded alarm signals. For example, for a set of six possible alarm types that can be encoded by the encoder device, the decoder devices installed in one area might have their decoding modules 210 configured to decode and present only three of the types, while the decoder devices installed in other areas might have their decoding modules 210 configured to decode and present only the other three types.

The decoder device 208 could be a clamp-on device, which is a discrete device, physically attached to the lighting power circuit 213 and working in conjunction with an existing lamp 218, for example, as a retrofit solution. In one example, the decoder device 208 is installed in the electrical switchgear cabinet 110 using double-sided adhesive tape, screws and/or magnets, to list a few examples, to secure a housing of the decoder device to an inner wall of the cabinet. The decoder device 208 might be connected to the lighting power circuit 213 via an electrical T-splice, which could be made by piercing through an insulation layer surrounding the conductors 214 of the lighting power circuit 213 with a metal tooth of a clam-shell quick connector.

On the other hand, the decoder device 208 might be integrated with the lamp 218 into a single device. For example, the decoder device 208 might be implemented as additional circuitry, including the decoding module 210 and indicators 104, within a housing for the lamp 218. These integrated decoder devices 208, which are combination lamp/decoder devices, would be especially useful for new installations of lighting systems and/or electrical switchgear cabinets 110 that do not require retrofit solutions. In this case, the alarm indicators 104 could be configured to provide the alarm indications 108 only when the door 120 of the electrical switchgear cabinet 110 is opened and to turn off and stop providing the alarm indications 108 when the door is closed, similar to the lamps 218 providing the cabinet illumination 109. Additionally, the integrated decoder device 208 could use the lamp 218 to provide the alarm indications 108, for example, by driving the lamp 218 to present the alarm indications 108 by changing properties of the light emitted by the lamps 218 to provide the cabinet illumination 109 (e.g. pulsing at a slow rate, blinking, and/or changing colors).

In the illustrated embodiment of the alarm signaling system 102-1, the decoder device 208 is interposed between the lamp 218 and the lighting power circuit 213. In this case, the decoder device 208 relays power from the lighting power circuit 213 to the lamp 218. The decoder device 208 includes a filter mechanism for filtering the encoded alarm signals from the power consumed by the decoder device 208 itself and from the power relayed to the lamp 218. This embodiment of the alarm signaling system 102-1, using the interposed decoder devices 208, might be appropriate for lighting systems with lamps 218 containing LEDs or other lighting mechanisms that would be sensitive to the modulated power on the lighting power circuit 213, resulting in perceptible changes to the cabinet illumination 109 provided by the lamps 218 such as blinking or dimming while the power is being modulated and the encoded alarm signals are being sent to the decoder devices 208.

Figure 2B:
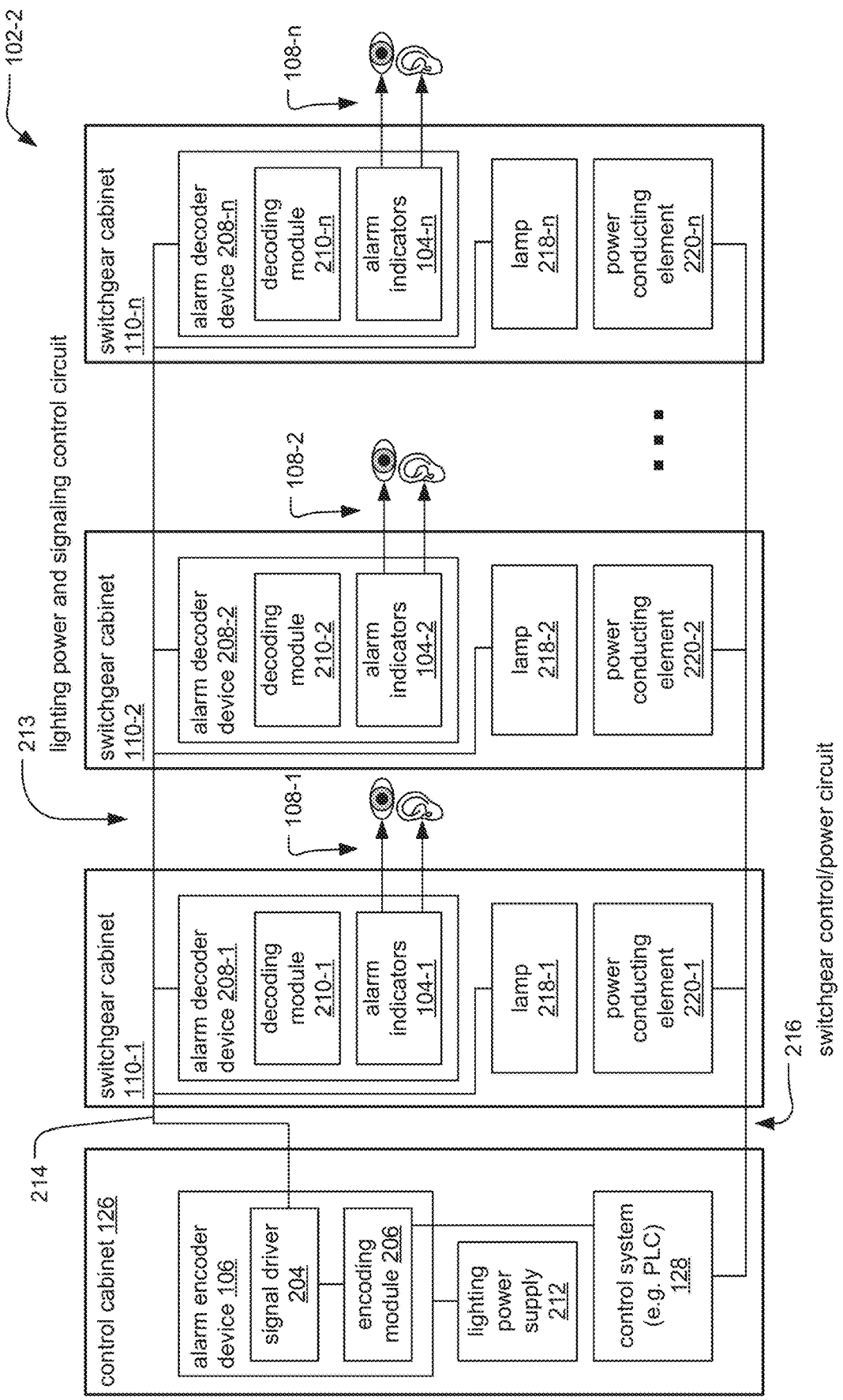
FIG. 2B is a block diagram of the alarm signaling system according to an embodiment in which the decoder devices and the lamps connect to the lighting power circuit in parallel.

FIG. 2B is a block diagram of an alternative embodiment of the alarm signaling system 102-2. The components and operation of the alarm signaling system 102-2 remain largely the same as the embodiment described with respect to FIG. 2A. Now, however, the decoder device 208 is not interposed between the lighting power circuit 213 and the lamp 218. Instead, the lamp 218 connects directly to the lighting power circuit 213 and receives the same modulated power (e.g. including the encoded alarm signals) as the decoder devices 208. Here, the lamps 218 might be filament lamps which would not be sensitive to the modulated power on the lighting power circuit 213. As a result, there would be no perceptible effects to the cabinet illumination 109 provided by the lamps 218 while the power is being modulated.

Figure 3:
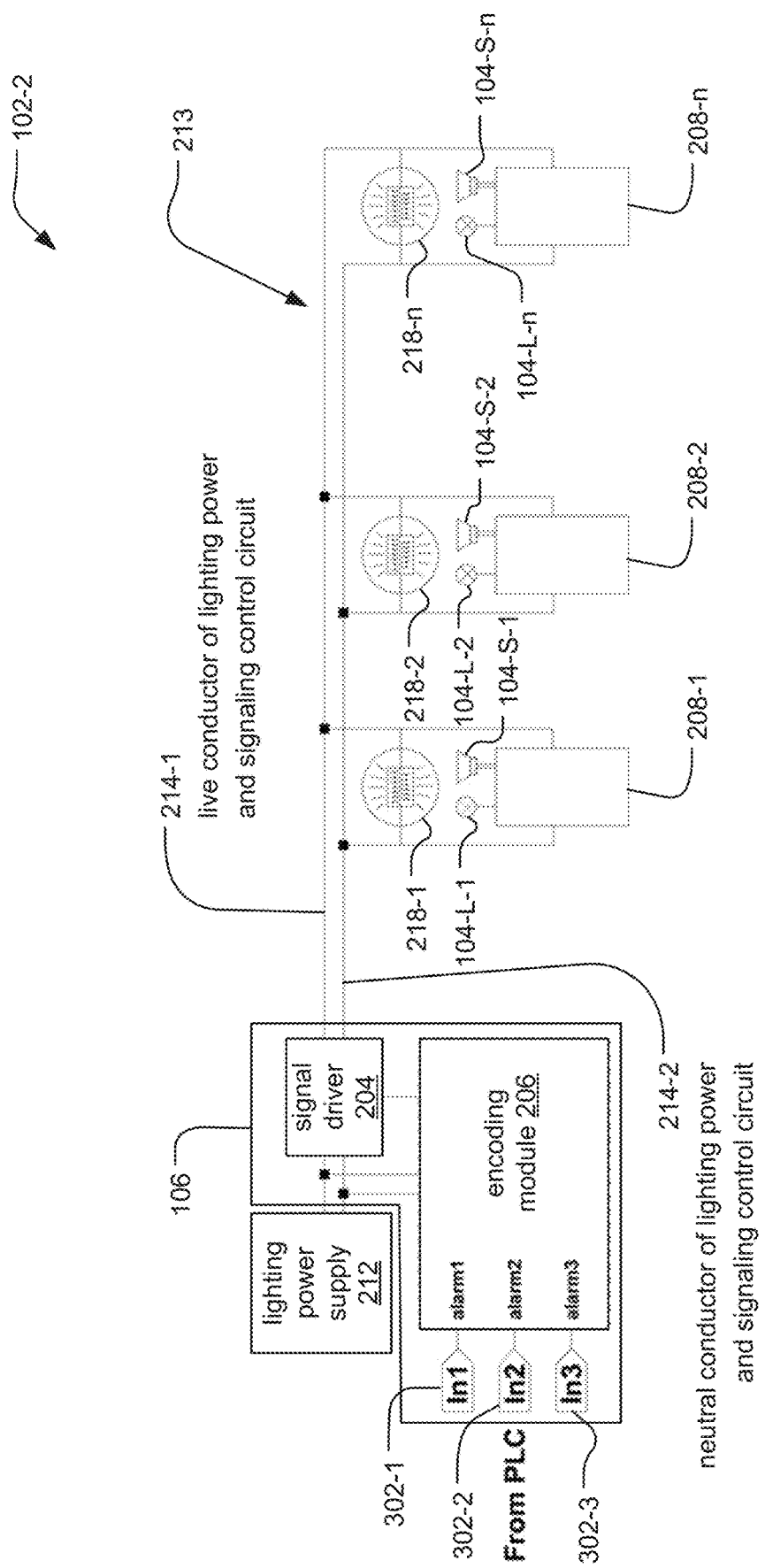
FIG. 3 is a circuit diagram of the alarm signaling system.

Any combination of the previously described alternative embodiments is possible. For example, a single alarm signaling system 102 can include both interposed decoder devices 208 that relay power from the lighting power circuit 213 to the lamps 218 as well as non-interposed decoder devices 208 that connect to the lighting power circuit 213 in parallel with the lamps 218. Similarly, the same alarm signaling system 102 can include alarm encoding modules 208 and lamps 218 that are discrete devices as well as alarm encoding modules 208 and lamps 218 that are integrated into a single device and/or housing FIG. 3 is a circuit diagram of the alarm signaling system 102-2. As previously described, the lighting power supply 212 provides power to the signal driver 204 and the encoding module 206 of the encoder device 106, which relays the power to the lamps 218 and the decoder devices 208-2.

Now, however, the components are shown in more detail.

Specifically, the encoder device 106 includes three input ports 302-1, 302-2, and 302-3 for receiving the alarm signals from the control system 128. Each of these input ports 302 might correspond to different alarm conditions. For example, the encoding module 206 might be configured to encode different alarm signals for three different alarm conditions designated as alarm1, alarm2, and alarm3. The encoded alarm signals would have different pulse sequences corresponding to the different alarm conditions. When the encoding module 206 receives an alarm signal from the control system 128 via the first input port 302-1, the encoding module 206 generates a pulse sequence associated with alarm1. On the other hand, when the encoding module 206 receives alarm signals via the second and third input ports 302-2, 302-3, pulse sequences associated with alarm2 and alarm3, respectively, are generated.

Additionally, the lighting power circuit 213 includes a live conductor 214-1 and a neutral conductor 214-2. The neutral conductor 214-2 is the return conductor of the lighting power circuit 213 connects to the ground or neutral terminal of the power supply 212. The live conductor 214-1 delivers electrical current to the decoder devices 208 and/or the lamps 218 via electrical potential with respect to the neutral conductor 214-2. In the illustrated embodiment, the live conductor 214-1 delivers the electrical current directly to the lamps 218 and directly to the encoder devices 208-2, and the neutral conductor 214-2 receives the returning current directly from the lamps 218 and directly from the encoder devices 208-2.

Figure 4:
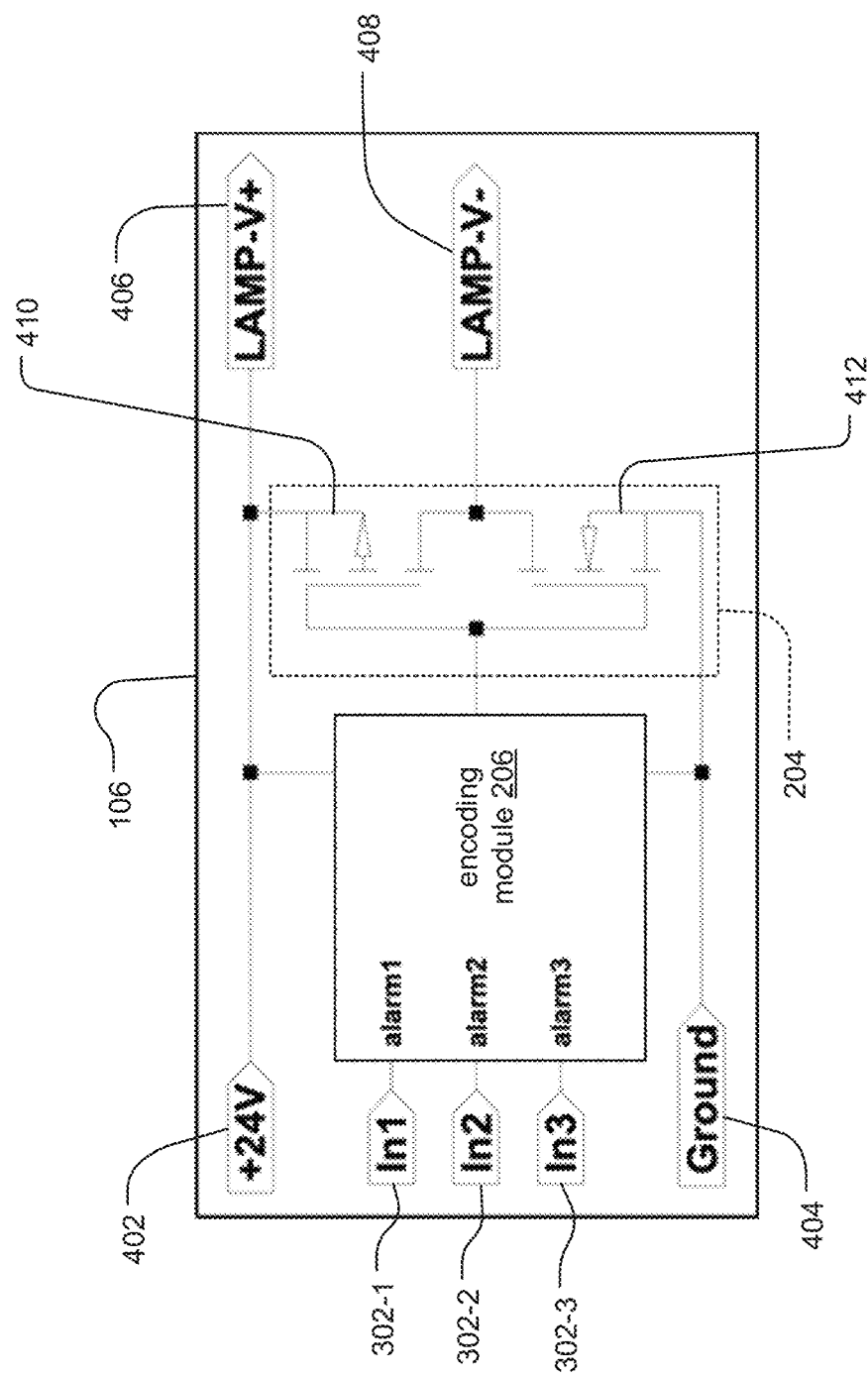
FIG. 4 is a circuit diagram of an encoder device of the alarm signaling system.

FIG. 4 is a circuit diagram of the encoder device 106. The encoder device 106 includes the encoding module 206, the signal driver 204 and the input ports 302 as previously described.

Now, however, the components are shown in more detail.

Specifically, the encoder device 106 includes a power input 402, a ground output 404, a lighting power output 406 and a lighting ground input 408.

The encoder device 106 is powered by the lighting power supply 212 via the power input 402 and the ground output 404. Specifically, a power circuit connecting the lighting power supply 212 and the encoder device 106 includes a live conductor delivering current to the encoder device 106 via the power input 402 and a neutral conductor receiving the current to be returned to the source via the ground output 404.

The power received by the encoder device 106 from the lighting power supply 212 is relayed to the decoder devices 208 and/or the lamps 218 via the lighting power circuit 213. Specifically, the lighting power output 406 delivers the current to the decoder devices 208 and/or the lamps 218 via the live conductor 214-1 of the lighting power circuit 213. The current is returned to the encoder device 106 from the neutral conductor 214-2 via the lighting ground input 408.

Additionally, in the illustrated embodiment, the encoder device 106 is a state machine that generates timing patterns based on applied input alarms. The signal driver 204 includes a P-type metal-oxide semiconductor (PMOS) transistor 410 and an N-type metal-oxide semiconductor (NMOS) transistor 412, which are meta-oxide-semiconductor field-effect transistors (MOSFET) with insulated gates, the voltage of which determines whether the transistor is conductive. Other configurations of MOSFET transistors, insulated-gate bipolar transistors (IGBTs) or bipolar transistors or mechanical switches could also be used in other embodiments.

The NMOS transistor 412 is in an ON state during normal operation, so that the Lamp-V− terminal 408 is electrically connected to the ground terminal 404 allowing the power to be relayed to the lighting power circuit 213 with a normal operating voltage. In one embodiment, the NMOS transistor 412 is in the ON state for a minimum of preferably greater than 99% to higher than 99.99% of the operating time of the encoder device 106 and has a relatively low resistance with respect to the current consumed by the lighting power circuit 213. At the same time, during normal operation, the PMOS transistor 410 is in an OFF/non-conducting state.

As previously described, the encoding module 206 outputs pulse sequences to the signal driver 204. When a pulse needs to be sent (e.g. whenever pulses of the pulse sequences are received from the encoding module 206), the NMOS transistor 412 turns to the OFF state, and the PMOS transistor 410 turns to the ON state, shorting the Lamp-V+ terminal to the shorting the Lamp-V− terminal, discharging the lighting power circuit 213 capacitance and momentarily dropping the voltage over the lighting power circuit 213. In one embodiment, the voltage drops to 0 V for a small duration of time (1 µs to 100 µs, in one example) and drops the voltage difference between Lamp-V+ terminal and the Lamp-V− terminal.

In other embodiments, the signal driver 206 might include other types of modulation circuitry for modulating the voltage over the lighting power circuit 213. In one example, the signal driver 206 is configured to modulate the voltage between a higher and a lower voltage, with both the higher and lower voltages being higher than the minimum working voltage required by the lamps 218. In this way, the decoder device 208 would not require filtering of the encoded alarm signals from the power provided to the lamps 218 in order to avoid perceptible modulation of the cabinet illumination 109. In this case, the signal driver 206 would be configured such that the modulation bandwidth does not exceed the bandwidth of the lighting power circuit 213 and/or the lamps 218. In one example, the bandwidth frequency would be configured to be between 0.5 Hertz (Hz) and 5 Hz.

Figure 5:
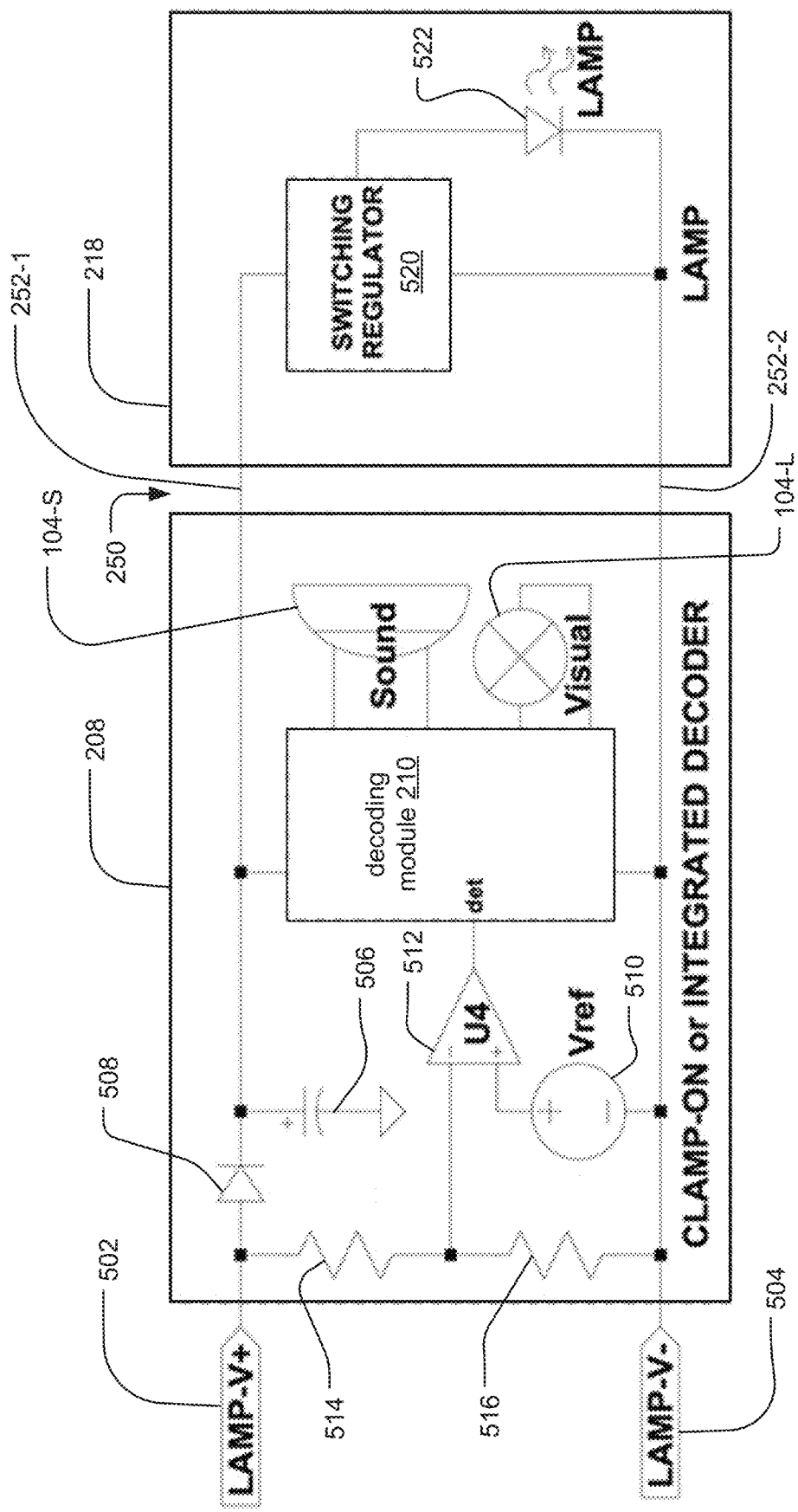
FIG. 5 is a circuit diagram of the decoder device.

FIG. 5 is a circuit diagram of the decoder device 208. Specifically, the illustrated example shows the decoder device 208 interposed between the lighting power circuit 213 and the lamp 218 and connected to the lamp 218 via the relay circuit 250. However, the same decoder device 208 and/or components might be used. As previously described, the decoder device 208 includes the decoding module 210 and the light indicator 104-L and the sound indicator 104-S.

Now, however, the components are shown in more detail.

Specifically, the decoder device 208 includes a lighting power input 502, a lighting ground output 504, a diode 508, a capacitor 506, a resistor divider, including two resistors 514, 516, a comparator 512, and a reference voltage source 510.

The decoder device 208 is powered by the lighting power circuit 123 via the lighting power input 502 and the lighting ground output 504. Specifically, the live conductor 214-1 of the lighting power circuit 213 delivers current to the decoder device 208 via the lighting power input 502, and the neutral conductor 214-2 of the lighting power circuit 213 receives the current to be returned to the source via the lighting ground output 504.

The incoming current from the lighting power circuit 213 is split into two paths.

One path is used for detecting pulses from the encoded alarm signals by directing the incoming current to pulse detection components of the decoder device 208. These pulse detection components include the resistor divider, including the first resistor 514 and the second resistor 516, the comparator 512 and the reference voltage source 510. The resistor divider lowers the voltage to a level for use by the decoding module 210. This divided voltage is compared to a predetermined reference value provided by the reference voltage source 510 via the comparator 512. The pulses are detected based on this comparison and output (e.g. as a digital signal corresponding to the detected pulses) to the decoding module 210.

The decoding module 210, in turn, decodes the encoded alarm signals based on the detected pulses (e.g. by translating the encoded alarm signals into different light and/or sound patterns). The decoding module 210 drives the light indicator 104-L and the sound indicator 104-S based on the decoded alarm signals.

The other path provides power to the components of the decoder device 208, including the decoding module 210 and the indicators 104. This path also powers the lamp 218 via the relay circuit 250. Specifically, the current is delivered to the lamp via a live conductor 252-1 of the relay circuit 250, and the current returns from the lamp 218 via a neutral conductor 252-2 of the relay circuit 250, to be returned to the source via the lighting ground output 504. The capacitor 506 filters the encoded alarm signals from the power provided to these components by storing power and then outputting the power during pulses, thus maintaining consistent voltage. The diode 508 prevents current from the capacitor from affecting pulse detection components of the decoder device 208 by isolating the path providing power to the decoder device 208 and the lamp 218 from the pulse detection components and preventing the capacitor 506 from canceling out pulses when the signal driver 204 discharges the capacitance of the lighting power circuit 213.

The decoder device 208 might also include in-rush control circuitry, which would be activated during initial charging of the capacitor 506 to avoid current protection triggering due to a high capacitive power circuit load. With additional wiring, the capacitor 506 could even be configured to power the lamps 218.

In situations where the alarm signaling system 102 is retrofit to existing cabinet lighting systems using filament lamps 218, the pulse duration would be too short to be noticed as light modulation. In this case, the decoder devices 208 could be connected to the lighting power circuit 213 in parallel with the lamps 213 (e.g. with a two leads connection). In this case, the capacitor 506 may not be necessary.

Additionally, to avoid the energy storage requirement during pulses, the signal driver 204 might be configured to use a dual level power supply. In this case, the voltage across the lighting power circuit 213 both during and between pulses would need to exceed a minimum working voltage for the lamps. This would not change the design of the pulse detection components of the decoder device 208, except for using a different reference voltage. The signal driver 204 would more complex, powering the load both during and between pulses and supporting the load requirements and load variations.

The lamp 218, as previously described, provides the cabinet illumination 109 independent of the operation of the decoder module 208 and includes a switching regulator 520 and an LED 522 (or string of LEDs). The switching regulator 520 is a constant current generator, such as the one described in the specification document entitled "LM3406 1.5-A, Constant Current, Buck Regulator for Driving High Power LEDs" from Texas Instruments, (September 2008). The incoming current from the live conductor 252-1 of the relay circuit 250 is directed to the switching regulator 520, which ensures that a constant current is, in turn, directed to the LED 522 (e.g. or string of LEDs). The LED 522 provides the cabinet illumination 109.

Figure 6:
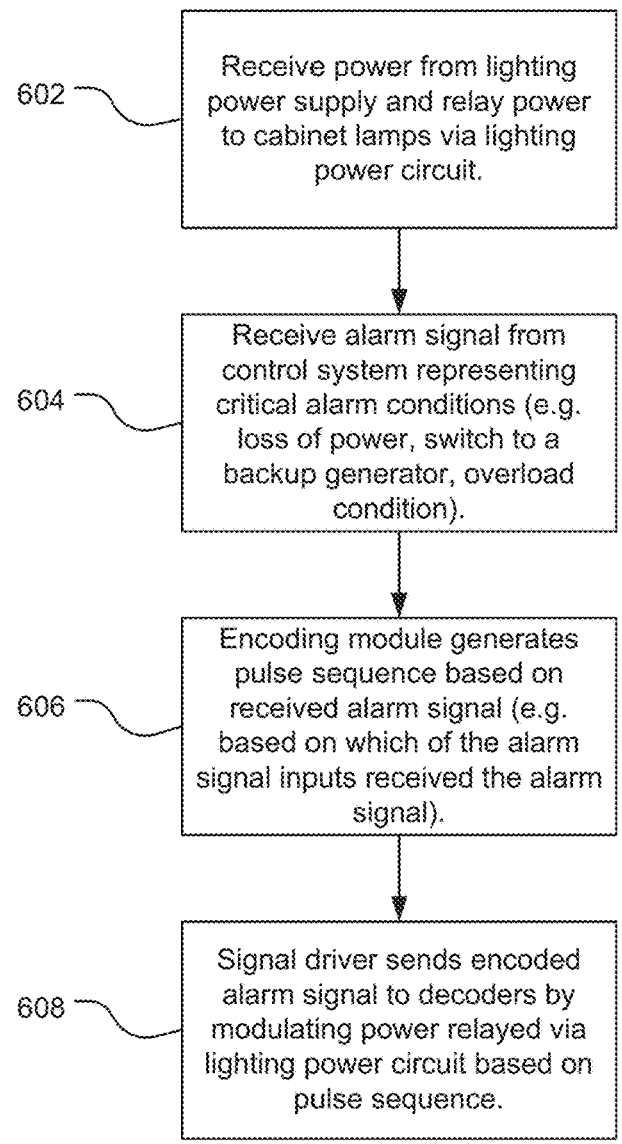
FIG. 6 is a flow diagram illustrating a process by which the encoder device generates encoded alarm signal on the lighting power circuit.

FIG. 6 is a flow diagram illustrating a process by which the encoder device 106 generates the encoded alarm signal on the lighting power circuit 213.

First, in step 602, the encoder device 106 receives power from the lighting power supply 212 and continuously relays the power to the lamps 218 of the electrical switchgear cabinets 110 via the lighting power circuit 213.

In step 604, the encoder device 106 receives alarm signals from the control system 128 via the input ports 302. The received alarm signals represent critical alarm conditions of the electrical switchgear cabinet system 100, such as a loss of power, a switch to a backup generator, and/or an overload condition.

In step 606, the encoding module 206 generates pulse sequences based on the received alarm signal. In one example, the pulse sequences are generated based on which of the input ports 302 received the alarm signals.

In step 608, the signal driver 204 sends the encoded alarm signals to the decoder devices 208 by modulating the power relayed to the decoder devices 208 and/or the lamps 218 via the lighting power circuit 213 based on the pulse sequences.

Figure 7:
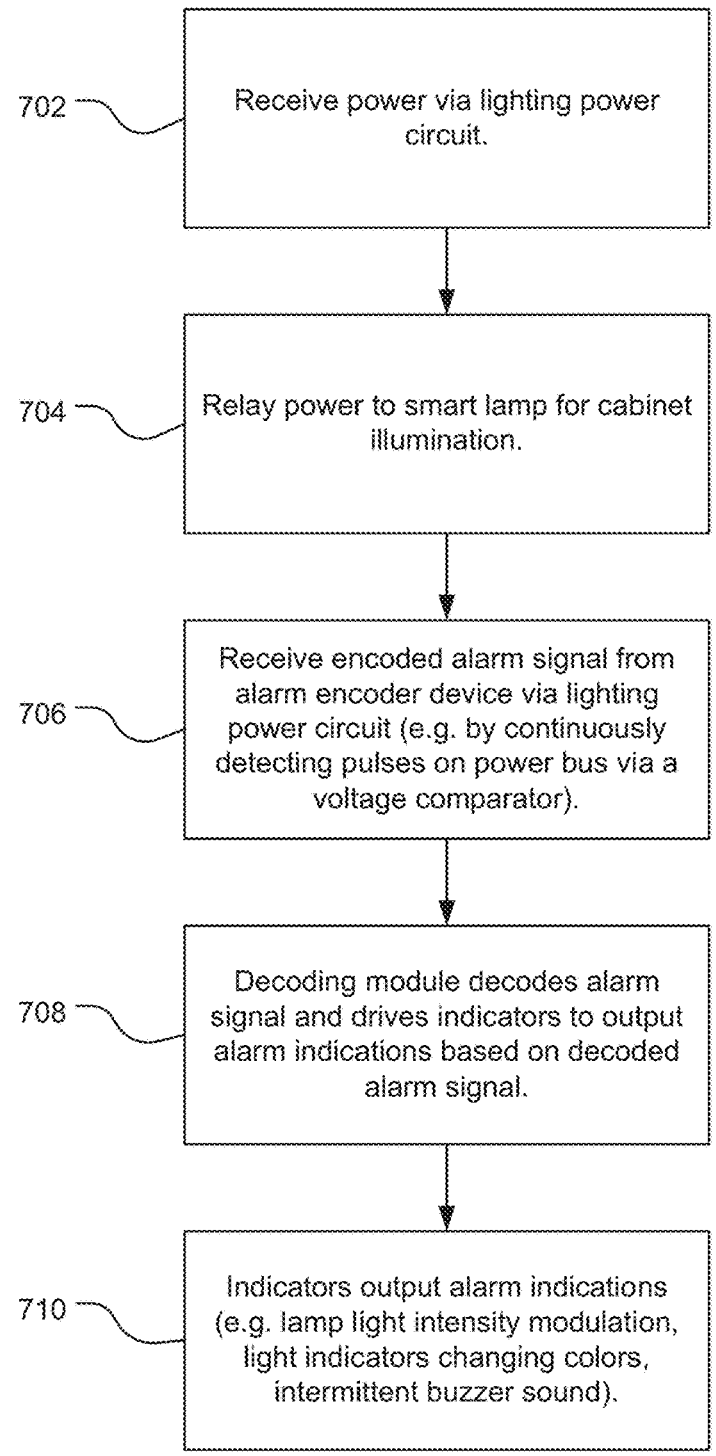
FIG. 7 is a flow diagram illustrating a process by which the decoder device decodes the encoded alarm signals drives indicators to present alarm indications based on the decoded alarm signals.

FIG. 7 is a flow diagram illustrating a process by which the decoder device 208 decodes the encoded alarm signals received from the encoder device 106 and drives the indicators 104 to present the alarm indications 108 based on the decoded alarm signals.

First, in step 702, the decoder device 208 receives the power relayed from the encoder devices 106 via the lighting power circuit 213.

In step 704, if the decoder device 208 is interposed between the lighting power circuit 213 and the lamp 218, the decoder device 208 continuously relays the power to the lamp 218 so that the lamp 218 can provide the cabinet illumination 109. However, it should be noted that step 704 might be optional in some applications, including for example, the embodiment of the alarm signaling system 102-2 in which the lamps 218 connect directly to the lighting power circuit 213.

In step 706, the decoder device 208 receives the encoded alarm signals from the encoder device 106 via the lighting power circuit 213 and identifies the encoded alarm signal by detecting pulses. For example, the decoder device 208 might continuously detect pulses, or short periods of lower and/or zero voltage, via the resistor divider 514, 516, the comparator 512, and the voltage reference source 510, signaling the decoding module 210 for every detected pulse.

In step 708, the decoding module 210 decodes the encoded alarm signal based on the detected pulses. In one example, the decoding module 210 identifies patterns of detected pulses associated with different alarm conditions and/or different alarm indications 108 to output. The decoding module 210 drives the indicators 104 to output the alarm indications 108 based on the decoded alarm signals.

In step 710, the indicators 104 output the alarm indications 108, for example, by emitting light via LEDs of light indicators 104-L and/or emitting sound via annunciators of sound indicators 104-S. The alarm indications 108 might include different properties associated with the alarm conditions represented by the alarm signals such as light intensity modulation, changing colors of the emitted light, and/or patterns of intermittent buzzing sounds, among other examples.

Figure 8:
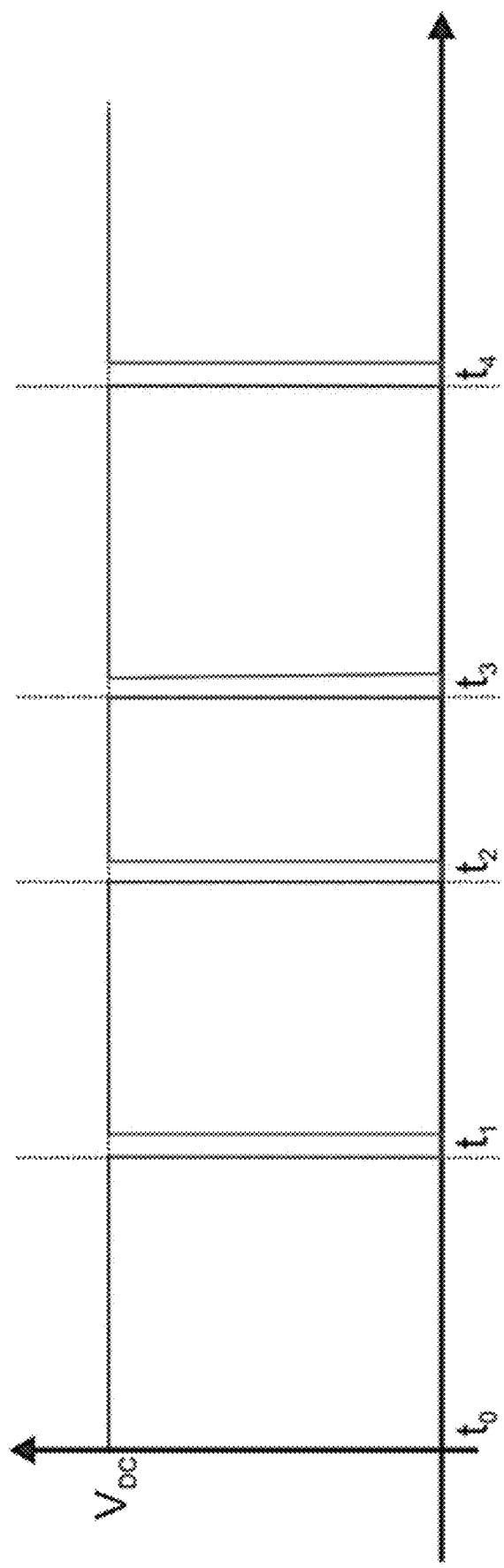
FIG. 8 is a graph depicting modulated voltage across the lighting power circuit during an exemplary timespan, according to an embodiment in which a signal driver of the encoder device is configured to drop the voltage across the lighting power circuit to zero during pulses.

FIG. 8 is a graph depicting the modulated voltage over the lighting power circuit 213 during an exemplary timespan. The x-axis for the graph represents different points in time, with different points of time labeled as $t_n$. The y-axis of the graph represents the voltage across the lighting power circuit 213 as determined by the signal driver 204 of the encoder device 106. The labeled value on the y-axis $V_{DC}$ represents the normal working voltage, between pulses, of the lighting power circuit 213. This is the voltage that is used, for example, to power the lamps 218.

In the illustrated example, the signal driver 204 is configured to modulate the voltage across the lighting power circuit 213 by dropping the voltage from the working voltage $V_{DC}$ to zero for short spans of time indicative of the pulses generated by the encoding module 206.

The graph shows the changes to the voltage across the lighting power circuit 213, during a time period when the encoded alarm signals are being transmitted from the encoder device 106 to the decoder devices 208. The time periods between $t_0$ to $t_1$, $t_1$ to $t_2$, $t_2$ to $t_3$, $t_3$ to $t_4$, and from $t_4$ onward, during which the voltage across the lighting power circuit 213 is equal to the working voltage $V_{DC}$, represent periods between pulses, which might be 99.99% of the operational time of the alarm signaling system 102. On the other hand, the points $t_1$, $t_2$, $t_3$, and $t_4$, at which the voltage across the lighting power circuit 213 drops to zero, represent the pulses themselves. In one example, the duration of these pulses might range from 1 µs to 100 µs in one example, or even shorter.

Figure 9:
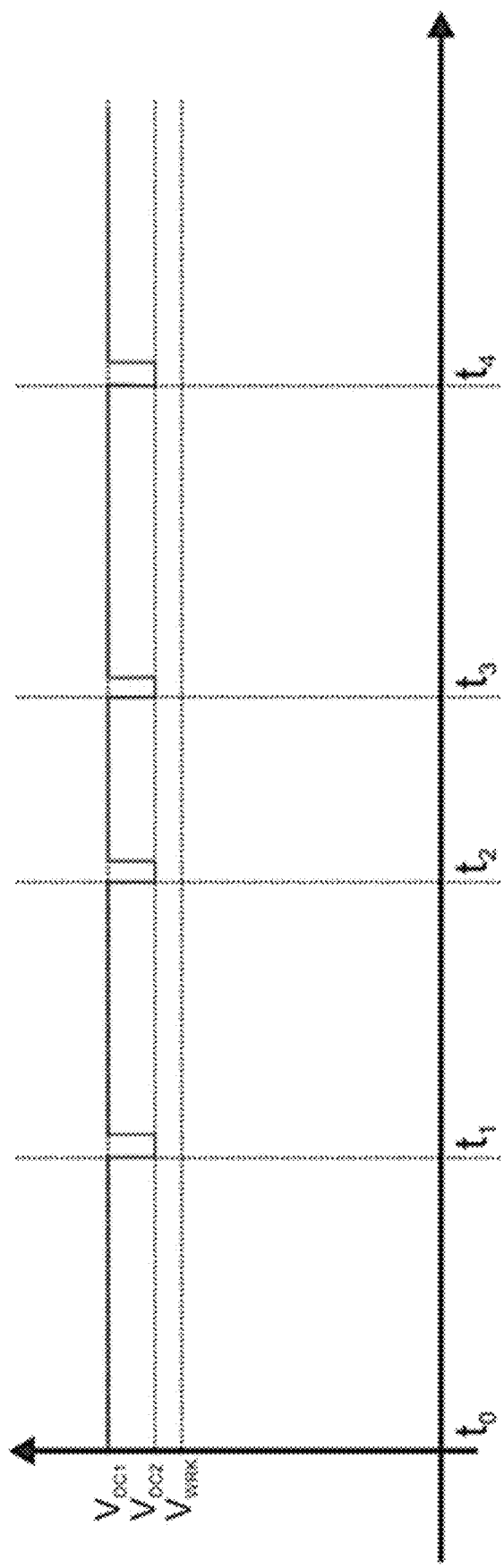
FIG. 9 is a graph depicting the modulated voltage across the lighting power circuit, according to an embodiment in which the signal driver is configured to drop the voltage from a higher voltage to a lower voltage during pulses.

FIG. 9 is a graph depicting the modulated voltage over the lighting power circuit 213 according to an alternative embodiment. The graph is similar to that depicted in FIG. 8.

Now, however, the signal driver 204 is configured to modulate the voltage across the lighting power circuit 213 between a higher and a lower voltage, with both the higher and lower voltages being higher than the minimum working voltage required by the lamps 218. The additional values $V_{DC1}$, $V_{DC2}$, and $V_{WRK}$ labeled on the y-axis represent the higher voltage, the lower voltage, and the minimum working voltage respectively.

The time periods between $t_0$ to $t_1$, $t_1$ to $t_2$, $t_2$ to $t_3$, $t_3$ to $t_4$, and from $t_4$ onward, during which the voltage across the lighting power circuit 213 is equal to the higher voltage $V_{DC1}$, represent periods between pulses. On the other hand, the points $t_1$, $t_2$, $t_3$, and $t_4$, at which the voltage across the lighting power circuit 213 drops to the value $V_{DC2}$, represent the pulses themselves. At all points in the exemplary timespan, the voltage across the lighting power circuit 213, as represented in the illustrated graph, is above the minimum working voltage $V_{WRK}$.

In this example, it would no longer be necessary to filter the encoded alarm signals from the power relayed from the decoder device 208 to the lamp 218 (e.g. via the capacitor 506), as the power provided by the lighting power circuit 213, even during pulses, would be above the minimum working voltage.

Figure 10:
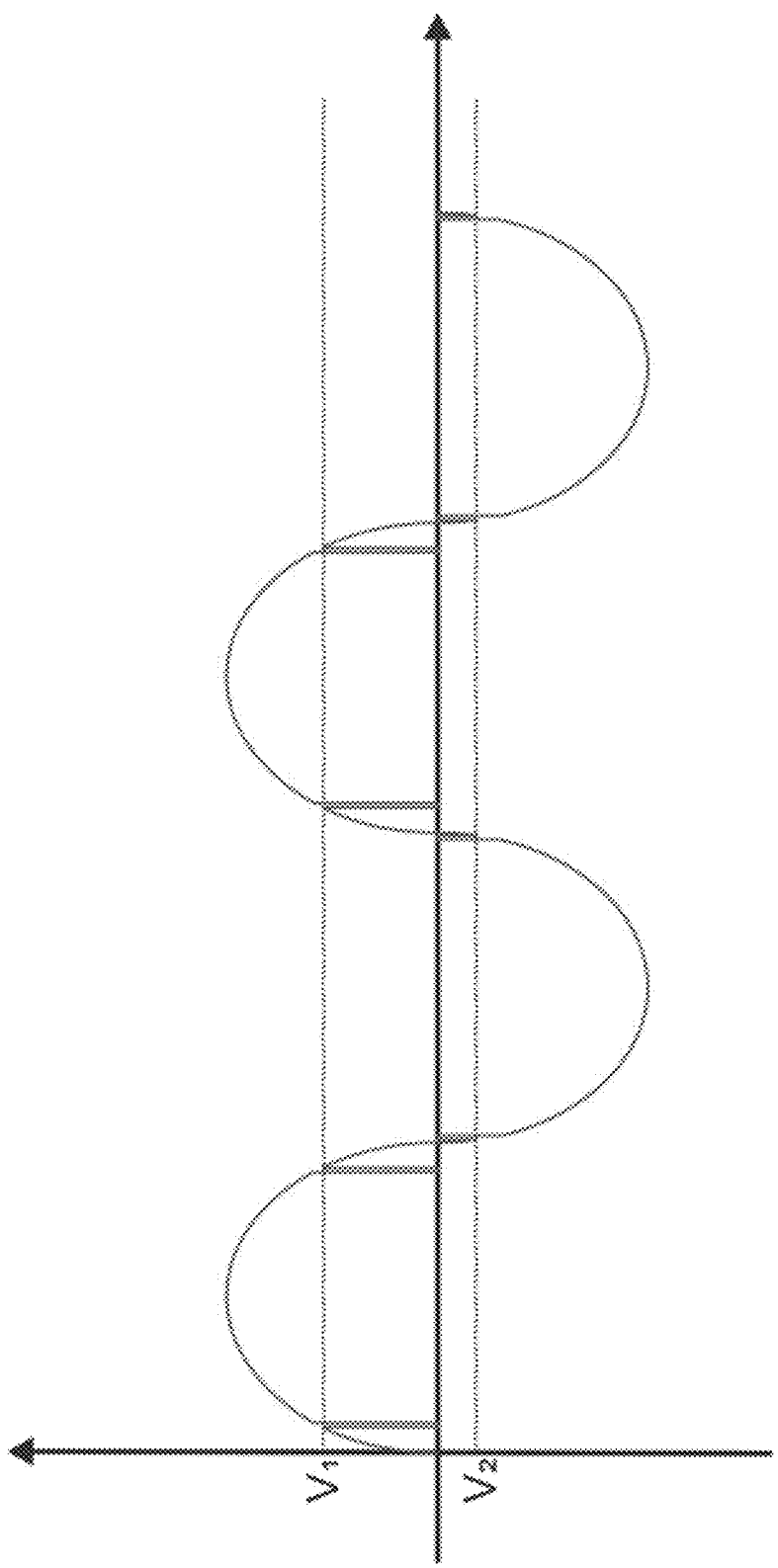
FIG. 10 is a graph depicting the modulated voltage across the lighting power circuit according to an alternative embodiment in which the lighting power circuit provides AC power to the lamps.

FIG. 10 is a graph depicting the modulated voltage over the lighting power circuit 213 according to an alternative embodiment in which the lighting power circuit 213 provides AC power. The graph is similar to the graphs of FIGS. 8 and 9. Now, however, the voltage across the lighting power circuit 213 oscillates between an arbitrary maximum and minimum amplitude value, at 50 or 60 Hz. As in the example illustrated in FIG. 8, the pulses are indicated by the spans at which the voltage is at 0. However, the drops in voltage vary, with some of the pulses dropping from a voltage $V_1$ to zero and others dropping from a voltage $V_2$ to zero. The signal driver 204 could be configured to signal pulses at lower voltages, with lower drops in voltage, which would allow for a simpler design due to a lower loss of power during the modulation.

While this invention has been particularly shown and described with references to preferred embodiments thereof, it will be understood by those skilled in the art that various changes in form and details may be made therein without departing from the scope of the invention encompassed by the appended claims.

What is claimed is:

1. An alarm signaling system for electrical switchgear cabinets, the alarm signaling system comprising:
   an encoder device for relaying power from a power supply to a power circuit for providing power to lamps for illuminating the electrical switchgear cabinets, the encoder device generating encoded alarm signals on the power circuit; and
   decoder devices for decoding the encoded alarm signals, the decoder devices comprising indicators for presenting alarm indications to persons based on the decoded alarm signals.

2. The system as claimed in claim 1, wherein the encoder device comprises an encoding module for generating pulse sequences representing alarm conditions and a signal driver for sending the encoded alarm signals to the power circuit by modulating the relayed power based on the pulse sequences.

3. The system as claimed in claim 2, wherein the signal driver modulates the relayed power with a duty cycle greater than 99.99%.

4. The system as claimed in claim 1, wherein the decoder devices are interposed between the power circuit and the lamps, and the decoder devices relay power from the power circuit to the lamps.

5. The system as claimed in claim 4, wherein the decoder devices further comprise filter mechanisms for filtering the encoded alarm signals from the power consumed by the decoder devices and from the power relayed by the decoder devices from the power circuit to the lamps.

6. The system as claimed in claim 4, wherein the decoder devices are incorporated into the lamps and drive the lamps to present the alarm indications by changing properties of light emitted by the lamps to illuminate the electrical switchgear cabinets.

7. The system as claimed in claim 1, wherein the decoder devices are discrete devices with respect to the lamps and connect to the power circuit in parallel with the lamps, and both the decoder devices and the lamps receive the power relayed by the encoder devices and the encoded alarm signals directly via the power circuit.

8. The system as claimed in claim 1, wherein the encoder device further comprises one or more input ports for receiving alarm signals from an external control system, wherein the encoder device generates the encoded alarm signals based on the alarm signals received via the one or more input ports.

9. The system as claimed in claim 1, wherein different encoded alarm signals represent different alarm conditions for the electrical switchgear cabinets, including a loss of power, a switch to a backup generator and/or an overload condition.

10. The system as claimed in claim 9, wherein the indicators comprise one or more colored light emitting diodes (LED) and/or one or more annunciators, the LEDs and annunciators presenting the alarm indications by emitting light and/or sound with different properties based on the different alarm conditions represented by the received encoded alarm signals.

11. The system as claimed in claim 9, wherein the different properties of the light and/or sound emitted by the indicators includes modulated light intensity, changing colors and/or intermittent buzzing sounds.

12. A method for signaling alarms for electrical switchgear cabinets, the method comprising:
   encoder devices relaying power from a power supply to a power circuit for providing power to lamps for illuminating the electrical switchgear cabinets and generating encoded alarm signals on the power circuit; and
   decoder devices decoding the encoded alarm signals and presenting alarm indications to persons based on the decoded alarm signals.

13. The method as claimed in claim 12, further comprising the encoder devices generating pulse sequences representing alarm conditions and sending the encoded alarm signals to the power circuit by modulating the relayed power based on the pulse sequences.

14. The method as claimed in claim 13, further comprising modulating the relayed power with a duty cycle greater than 99.99%.

15. The method as claimed in claim 12, further comprising the decoder devices relaying power from the power circuit to the lamps.

16. The method as claimed in claim 15, further comprising the decoder devices filtering the encoded alarm signals from the power consumed by the decoder devices and from the power relayed by the decoder devices from the power circuit to the lamps.

17. The method as claimed in claim 15, wherein the decoder devices are incorporated into the lamps and drive the lamps to present the alarm indications by changing properties of light emitted by the lamps to illuminate the electrical switchgear cabinets.

18. The method as claimed in claim 12, further comprising both the decoder devices and the lamps receiving the power relayed by the encoder devices and the encoded alarm signals directly via the power circuit, wherein the decoder devices are discrete devices with respect to the lamps.

19. The method as claimed in claim 12, further comprising the encoder devices receiving alarm signals from an external control system via one or more input ports and generating the encoded alarm signals based on the alarm signals received via the one or more input ports.

20. The method as claimed in claim 12, wherein different encoded alarm signals represent different alarm conditions for the electrical switchgear cabinets, including a loss of power, a switch to a backup generator and/or an overload condition.

21. The method as claimed in claim 20, further comprising the decoder devices presenting the alarm indications by emitting light and/or sound with different properties based on the different alarm conditions represented by the received encoded alarm signals via one or more colored light emitting diodes (LED) and/or one or more annunciators.

22. The method as claimed in claim 21, wherein the different properties of the light and/or sound emitted by the indicators includes modulated light intensity, changing colors and/or intermittent buzzing sounds.

23. The system as claimed in claim 1, wherein the lamps illuminate inside portions of the electrical switchgear cabinets.

24. The system as claimed in claim 1, wherein each of the lamps provides cabinet illumination for a different one of the electrical switchgear cabinets.

25. The system as claimed in claim 24, wherein the power circuit for providing power to the lamps includes one or more wires for conducting electrical current to each of the lamps.

26. The system as claimed in claim 1, wherein the encoder device and lighting power supply are housed in a control cabinet for the electrical switchgear cabinets, and each electrical switchgear cabinet includes one of the decoder devices and one of the lamps.

* * * * *